Nov. 5, 1935.  W. M. STRATFORD  2,020,086
TREATING HYDROCARBON OILS
Filed Nov. 15, 1930
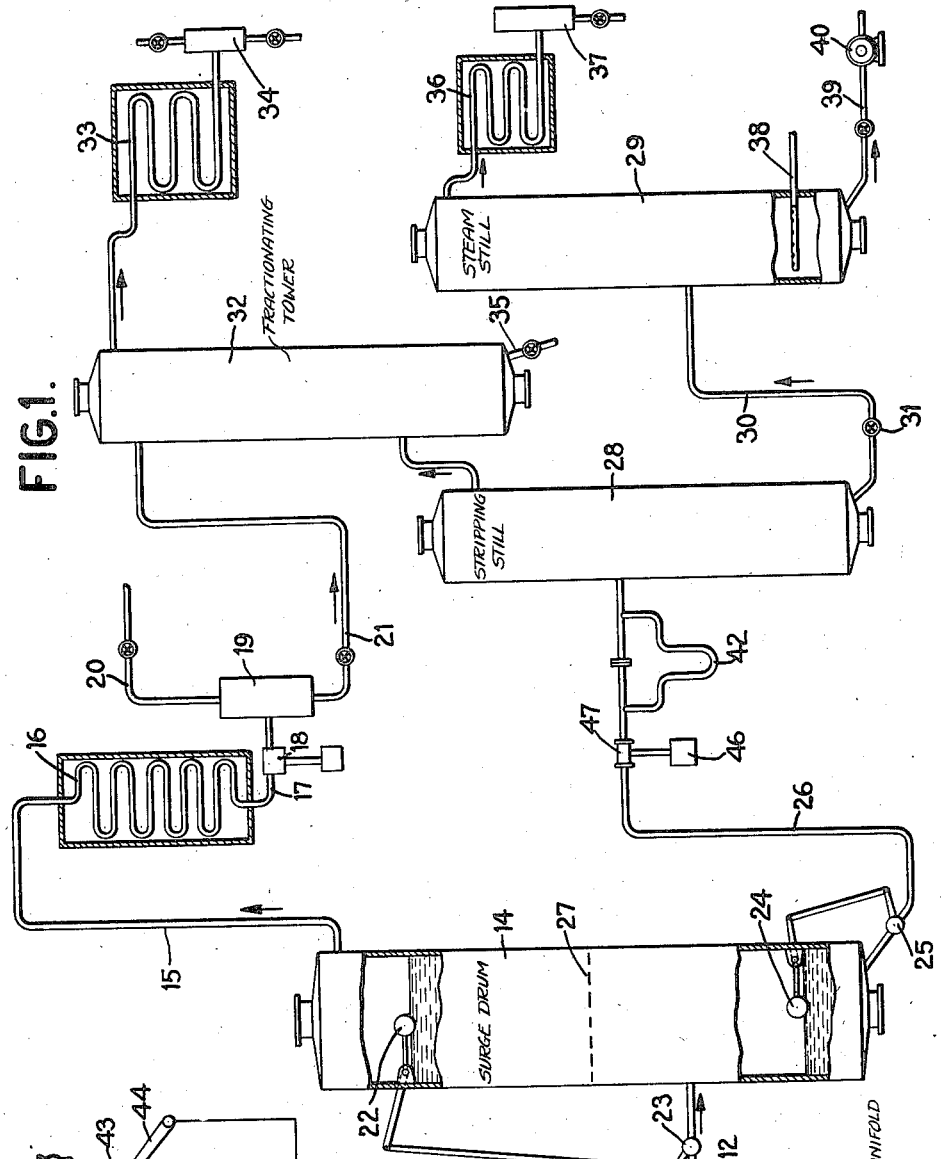
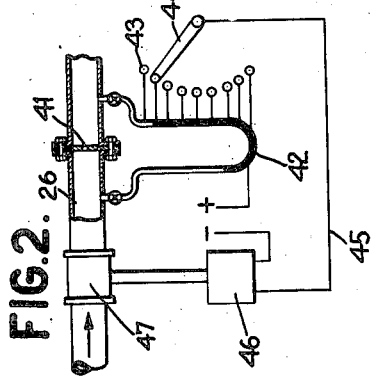
William M. Stratford
INVENTOR
BY ATTORNEY
R. J. Dearborn Patented Nov. 5, 1935

2,020,086

UNITED STATES PATENT OFFICE 2,020,086

TREATING HYDROCARBON OILS

William M. Stratford, New York, N. Y., assignor to The Texas Company, New York, N. Y., a corporation of Delaware Application November 15, 1930, Serial No. 495,827

1 Claim. (Cl. 196—49)

This invention relates generally to the conversion of higher boiling hydrocarbons into lower boiling ones and has particular reference to certain improvements in the treatment of liquid oil or residue developed in the cracking reaction.

It has been sought to utilize the heat contained in residual or liquid oil as withdrawn from a cracking chamber to effect the distillation thereof, for the purpose of recovering therefrom gasoline or naphtha distillates as well as heavier distillates, by directing the oil withdrawn from the cracking chamber into an expansion chamber or still operating at reduced pressure to effect the distillation. One of the chief difficulties experienced in such procedure is that when the discharge of residue from the cracking still into the tar distilling chamber is effected by taking shots in a customary manner, the residue distilling chamber is necessarily subjected to great fluctuations in pressure which disturbs the conditions of distillation therein. It is desirable to maintain the residue distilling chamber at substantially a uniform pressure throughout the distillation in order that the products obtained in the distillation may be constantly kept at the tests desired. The operation in the residue distilling chamber may be smoothed out somewhat when a single residue stripping unit is operated in conjunction with a plurality of batteries of pressure stills by timing the taking of shots from the several batteries and the same result can be obtained, although to a more limited extent, when a single battery composed of a plurality of stills is used by properly timing the shots taken from the several stills, but even these procedures do not accomplish that even distillation in the distilling chamber which is desirable.

In accordance with my invention a surge drum or chamber is provided into which products from the pressure cracking still are discharged. This surge drum is adapted to contain a quantity of liquid and operates to cushion or absorb the effect of the uneven delivery of material to the chamber so that liquid may be conducted from the surge chamber into the main stripping or distilling apparatus, wherein approximately constant conditions may be maintained. The surge chamber is arranged to carry on distillation when the rise in pressure therein exceeds a predetermined amount.

In order to more fully disclose the invention reference will now be had to the accompanying drawing which illustrates a preferred embodiment of the invention wherein:

Fig. 1 is a diagrammatic sectional elevation of an apparatus constructed in accordance with the invention and constituting an embodiment thereof;

Fig. 2 is a sectional detail showing a method of regulating the flow of liquid through the transfer line from the cushioning still to the stripping still.

In the apparatus thus illustrated, a plurality of lines 10 are shown which extend to a plurality of batteries of pressure cracking stills and are adapted for the withdrawal of products from these stills, such as tar or residue developed in the cracking operation. The lines 10 extend to a common tar or residue header 11 and a line 12, provided with a pressure reducing valve 13, serves to conduct the liquid from the header 11 to a cushioning still 14.

The cushioning still is shown provided with a vapor line 15 and extending to a condenser coil 16 having an outlet line 17 in which is disposed a control valve 18. The valve 18 is intended to prevent the discharge of liquid through the line 17, except when the pressure in the still 14 is increased to a predetermined amount for which the valve is set, and when the pressure exceeds this given amount, fluid is permitted to be discharged through the valve to a receiving drum 19, which may be conveniently equipped with a gas outlet pipe 20 and a condensate outlet line 21.

It is advantageous to equip the cushioning still 14 with an upper level float 22 arranged to control a valve 23 in the line 12, and with a lower level float 24 arranged to control a valve 25 in a draw-off line 26. Under ordinary conditions of operation the normal level of liquid in the cushioning still 14 may be at some intermediate point such as at 27; in case however of an excessive influx of material into the cushioning still, the level of the oil may rise, and when the level reaches the float 22 the float operates to close the valve 23 so as to stop the flow of liquid through the line 12 into the still 14 and thus prevent the passage of residual oil into the vapor line 15 and condenser coil 16. In case the level of the liquid in the still 14 descends to the float 24, this float will operate to close the valve 25 so as to thus prevent the further passage of liquid through the line 25, and thereby avoid the withdrawal of all of the liquid from the cushioning still 14. It will be understood that the level of liquid in the cushioning still 27 may fluctuate within comparatively wide limits within the still, depending upon the influx of material through the line 12 and the delivery of material through the line 26.

The line 26 constitutes a transfer line for removing fluid from the cushioning still 14 and conducting it to the main distilling apparatus. In the apparatus illustrated this distilling apparatus includes a primary evaporating chamber 28 and a secondary evaporating chamber 29 with a transfer line 30 adapted for conducting residue from the first still 28 to the second still 29. A valve 31 is shown in the line 30 so that the pressure in the still 29 may be lower than that in the still 28.

The primary evaporator 28 is provided with a dephlegmator or fractionating tower 32 for fractionating the evolved vapors. The condensate line 21, which leads from the receiver 19, is shown as communicating with the upper portion of the tower 32 so that the distillate collected in the receiver 19 may be utilized as reflux for the tower 32. Additional cooling means may be employed as needed. The overhead vapor fraction from the tower 32 is condensed in a condenser 33 and collected in a receiver 34. The reflux condensate formed in the tower is withdrawn through a line 35. The distillate collected in the receiver 34 will be a light distillate, such as gasoline or naphtha, and the condensate withdrawn through the line 35 will constitute a heaver fraction adapted for recycling to the cracking zone. It is ordinarily unnecessary to provide the secondary still 29 with a fractionating tower, since all of the light constituents will have been removed in the primary still 28, and consequently it is generally sufficient to merely provide the still 29 with a condenser coil 36 for condensing the evolved vapors and with a receiving drum 37 for collecting the condensate, which is also adapted for recycling to a cracking zone.

A line 38 is shown for introducing the steam into the secondary still 29. A line 39 and pump 40 are indicated for withdrawing residue from the still 29.

In order to insure a uniform and constant flow of material to be distilled to the primary evaporator 28 through the transfer line 26 a constant flow regulating means may be provided which may include an orifice or construction at 41 with connections on either side of the constriction extending to a U-tube 42 containing a mercury column adapted to register variations in the drop in pressure through the constriction. A plurality of contacts 43 and a switch 44 are provided for establishing connection between the mercury column and an electric conductor 45, which is in circuit with a suitable source of energy adapted to operate a regulator 46 which controls the movement of a valve 47 in the line 41. It will be understood that the switch 44 is set at the contact desired and the apparatus will then function to automatically deliver a constant quantity of fluid through the line 26 to the primary evaporator 28.

In practicing the invention the cracking stills may be operated under any pressure and any temperature desired and the cushioning still 14 will operate at fluctuating pressures intermediate the cracking still pressure or the pressure in the line 11 and the pressure obtaining in the stripping still 28. Thus, for example, assuming the cracking stills are operating under a pressure of 400 lbs., and the primary evaporator 28 operating at atmospheric pressure, or say 25 or 50 lbs., the pressures in the cushioning still 14 may ordinarily vary within comparatively wide limits, such as for example from 100 lbs. up to 300 lbs. Under such conditions the valve 18 will be set so as to release products into the receiver 19 only upon a predetermined rise of pressure in the still 14, such as for example when the pressure reaches 200 or 250 lbs. Thus it will be understood that under the lower ranges of pressure obtaining in the cushioning still 14 there may be no passage of fluid into the receiver 19, but there will be expansion and contraction of products in the still 14 operating to absorb the shock of the delivery of material through the several batteries of cracking stills. In case the pressure rises above the the lower pressure ranges that obtain in the chamber 14, such as for example when the pressure reaches 200 lbs. or 250 lbs., (the degree of pressure for which the valve 18 is set) the release of distillate into the receiver 19 serves to act as a further absorbing means. The distillate thus collected in the receiver 19, while composed predominantly of light constituents such as gasoline, will ordinarily contain heavy ends and will not usually be a well fractionated product such as may be desired in the ultimate distillate as collected in the receiver 34, and consequently this poorly fractionated distillate collected in the receiver 19 may well be refluxed to the tower 32 and subjected to distillation and fractionation therein.

By absorbing variations of pressure due to the uneven delivery of material to the cushioning still 14, by contraction and expansion of material therein, as well as by the distillation upon a predetermined rise in pressure therein, it is possible to thus provide for the delivery of a constant flow of material to the primary evaporator 28. By further providing a flow regulator in the transfer line 26, it is possible to provide such a uniform delivery of fluid to the primary stripping still 28 that constant conditions may be maintained therein, as well as in the secondary distilling chamber 29.

The pressure in the secondary stripping still 29 is preferably below the pressure obtaining in the primary stripping still 28, the pressure being reduced in the still 29 to the extent desired, dependent upon the particular products it is desired to obtain. The distillation in the still 29 may advantageously be carried on under a vacuum for the production of a pitch, which may be withdrawn while hot and in a fluid state, as by means of the line 39 and pump 40, and which solidifies upon cooling; or if desired the oil delivered to the still 29 may be reduced down to coke. When subatmospheric conditions are employed in the still 29 it is desirable to use a vacuum pump connected to the receiving drum 37, preferably above the liquid level.

Obviously many modifications and variations of the invention, as hereinbefore set forth, may be made without departing from the spirit and scope thereof, and therefore only such limitations should be imposed as are indicated in the appended claim.

What I claim is:

In the cracking of hydrocarbon oils the process that comprises intermittently withdrawing hot residue from a pressure cracking vessel maintained at cracking temperatures and at superatmosphere pressures and directing said residue into a surge chamber wherein the pressure is materially lower than that of the cracking vessel, transferring residue at a constant rate from said surge chamber to a stripping still, removing vapors from said surge chamber to prevent the pressure within the chamber from exceeding a predetermined value, condensing said vapors to produce a distillate, conducting vapors from said stripping still to a fractionating tower and introducing said distillate into said tower as reflux condensate.

WILLIAM M. STRATFORD.